United States Patent Office 3,226,137
Patented Dec. 28, 1965

3,226,137
FIRE-HOSE MENDER
Otto A. Trnka, Rte. 3, Box 217, Saugerties, N.Y.
Filed Apr. 16, 1962, Ser. No. 187,541
3 Claims. (Cl. 285—113)

This invention relates to hose menders generally, but more specifically to menders of hose employed as fire-fighting equipment.

This invention is particularly applicable towards solving the problem of mending, quickly and on the spot, hose that has burst, burnt, or otherwise been damaged during the actual playing of water onto a fire. Moreover, when the conflagration is extensive and widespread, the damaged hose may be quite distant from the source of water, making it impractical to replace the damaged hose with an entirely new hose. While it is known that there are available numerous fire-hose menders for making on the spot repairs of damaged hose, such known menders are objectionable in that they require tools, bolts, or auxiliary equipment for carrying out the repair of damaged hose. It is obvious that such additional equipment places an undue burden on the fire-fighter and his colleagues.

The present invention has obviated the need of tools in making quick repairs of damaged hose by employing a screwless, boltless, and simplified locking means that can be operated entirely by hand so that a hose can be repaired without the need for auxiliary equipment. The invention permits the torn hose to be manually inserted between a movable serrated sleeve and a movable rubber wedge, such sleeve having a lip or rim portion thereon that contacts one edge of the wedge. The sleeve and wedge are held within a housing that forms the body of the mender. The operator inserts the hose to be repaired into the main body of the mender between the sleeve and wedge, then pulls simultaneously on both sleeve and hose, causing the rim to urge the wedge against the main body of the mender as well as against the sleeve. Such manual force grips the hose firmly, but as soon as water under pressure begins to flow into the mender, hydrostatic pressure is applied to such rim portion of the sleeve so as to increase the wedging action started by manual force. Continued flow of water through the mender serves to increase the gripping action of the mender.

It is an object to provide a quick, self-locking and self-sealing fire hose mender.

It is another object to provide such a mender that is operable entirely by hand, requiring no auxiliary tools to perform the temporary repair.

It is yet another object to effect such manual repair employing very few parts in the mender itself.

It is a further object to provide a quick, on the spot, mender that is so strong that other portions of a hose will yield to high water pressure before the mended section will blow or yield.

Figure 1:
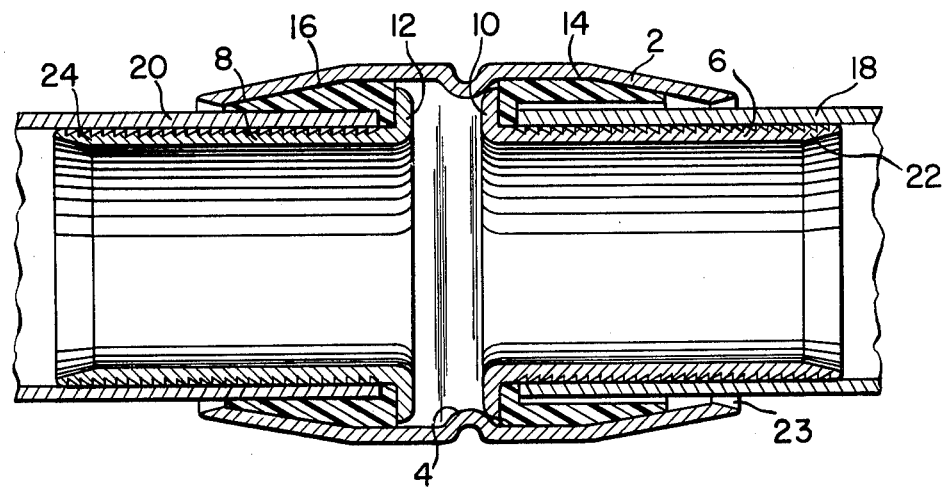
Figure 2:
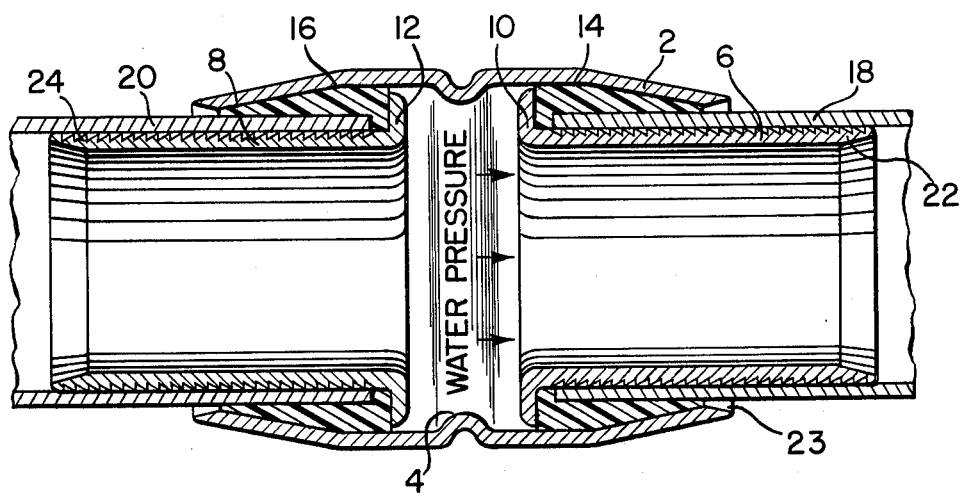

Further objects of the invention will appear from the following specification taken in connection with the drawing which forms a part of this application, and in which FIG. 1 is a sectional view of the invention when the latter is not under water pressure, and FIG. 2 is the same sectional view when water under pressure is flowing in the mender.

Figure 3:
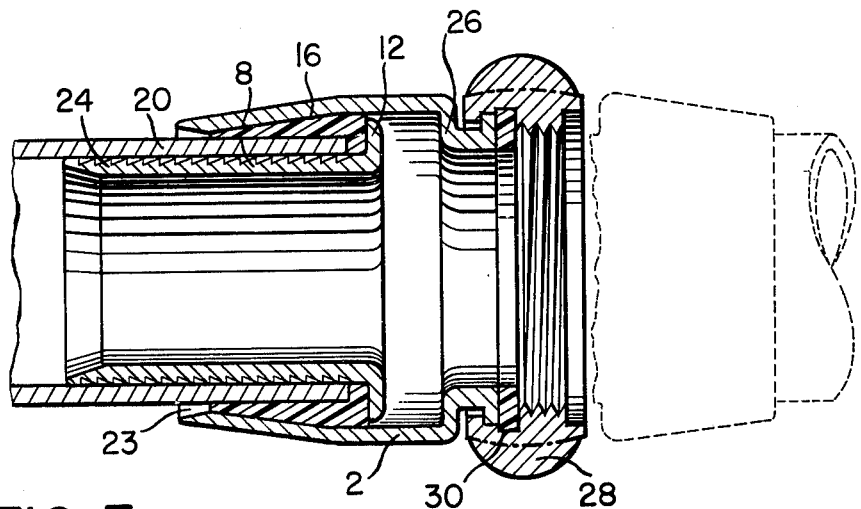
Figure 4:
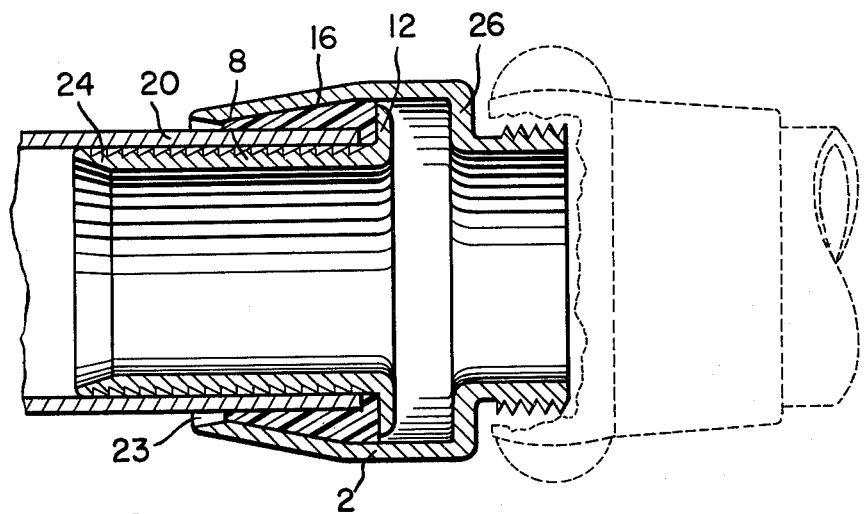

FIG. 3 is a second embodiment of the invention, adapting the invention to serve as an attachment to a standard hose-coupling, and FIG. 4 is yet another embodiment of the invention.

Turning to FIG. 1, there is shown the outer body 2 or cap that comprises the main body housing for the fire hose mender and the central portion of such body 2 is formed with a depression or rib 4. Placed within the outer body 2 and on both sides of rib 4 are inner sleeves 6 and 8, each sleeve having a lip or rim 10 or 12, the rib 4 serving to limit the motion of either sleeve 6 or 8 toward the center of main body 2. A wedge 14 is located between outer body 2 and sleeve 6 and a similar wedge 16 is inserted between sleeve 8 and body portion 2. Such wedges 14 and 16 can be made of neoprene, rubber, plastic or other suitable materials which have the characteristics of being slightly or moderately deformable yet will not be adversely affected when exposed to water. Such materials being referred generically hereinafter and in the claims as elastomeric.

In the practice of this invention, it is permissible to manufacture the sleeve 6 separate from wedge 14, but a recommended way of making the mender is to vulcanize, fuse, or otherwise affix the wedge 14 to rim 10 of sleeve 6 (the same holds true for wedge 16 and rim 12) for reasons to be set forth soon hereafter. That outer surface of each sleeve which will be in contact with a hose to be inserted is serrated.

Assuming that there is a break in a fire-hose and a quick temporary mend is to be made at the very location where the damage occurs: After the water source has been turned off, a sharp knife is used to square the ends of the hose 18 that is to be secured or coupled to the mender. The hose 18 is manually inserted between sleeve 6 and wedge 14 and is urged toward the center of the mender until rim 10 contacts rib 4, at which time, sleeve 6 is manually gripped through hose 18 and both hose and sleeve are urged to the right of FIG. 1 until wedge 14 is urged by rim 10 to its furthermost point of travel. The wedge 14, in being manually urged toward the tapered portion of body 2, forces hose 18 against the serrated face of sleeve 6.

The left side of FIG. 1 shows the position of the elements corresponding to the right side of FIG. 1 after rim 12 has urged its corresponding wedge 16 into locking position. Hose 20 is the other cut section of the damaged hose which has been tightened into place, the condition that the right side of FIG. 1 will be in after sleeve 6 and hose 18 have been pulled until its associated wedge 14 is in its gripping condition. Attention is brought to the fact that sleeve 6 (or 8) extends beyond opening 23 that marks the end of main body section 2 when rim 10 of sleeve 6 has moved to its furthest inward position. Such extension 22 (or 24) permits one to manually grip both hose 18 and sleeve 6 at location 22 so as to move wedge 14 into its wedging position.

FIG. 2 illustrates the condition of the mender after the hose has been repaired and water under pressure has been re-established. It is seen that hydrostatic pressure is applied against rims 10 and 12 and such pressure acts in the same direction as the force originally applied manually. The fusion of wedge 14 to rim 10 of sleeve 6 aids in serving as a seal and thus prevents water from seeping into the chamber area that houses such wedge 14.

The mender can be made of aluminum, stainless steel, brass or other suitable rustproof material. The body 2 is shaped to be streamlined and conform to the general shape of hose 18 or 20 so that the motion of the mender across grassy or wooded terrain will not cause the mender to pick up debris or interfere with the movement of the hose across such terrain. The rib 4 can be replaced by lugs, dimples, or any other means for limiting the inward travel of sleeves 6 and 8.

FIG. 3 teaches how one may adapt the invention shown in FIG. 1 to serve as an attachment to a standard hose-coupling. This embodiment is employed when the hose is damaged, torn, or burst near the end of a hose or near the coupling of such hose. In such instances, it would be better to employ the mender as a coupling device. Thus, main body 2 is, in effect, half of what is shown in FIG. 1. The end of the body 2 is made free-fitting to the swivel nut 28, which is threaded to serve as a female member to accept the standard male end of a hose-coupling shown in dotted lines in FIG. 3. 30 is a conventional gasket.

In FIG. 4, the invention is modified so that the end 26 of the main body section 2 is threaded to serve as a male member for insertion into a standard female end of a hose-coupling shown in dotted lines in FIG. 4. In essence, the features of FIGS. 3 and 4 are substantially the same as the features set forth in FIGS. 1 and 2, save that in FIGS. 3 and 4 the mender of FIG. 1 is employed as a coupling attachable either to a male or female coupling.

From the foregoing description it will be seen that the improved hose mender is especially useful in making a quick, self-sealing fire hose mender, requiring no tools, is totally manually operable, and is so constructed that increased water pressure through the mender only serves to further tighten the grip the mender has about the split sections or torn end of a hose. It is to be understood that while the invention has been described in terms of repairing fire hoses, it is obvious that the invention can be employed for mending all types of hoses, such as garden hoses, oil hoses, etc. The mender is rugged yet simple to construct and can be reused to mend other damaged hoses.

I claim:

1. A hose mender for flexible hoses having a hollow main body section, the interior wall of which tapers from a maximum diameter substantially at its midsection to a minimum diameter at each end, a tubular hose-entering chamber at each end of said main body section, each chamber containing a rigid movable cylindrical sleeve having a radially outwardly extending rim at that end of said sleeve which is closer to the midsection of said hollow body section, the outer diameter of said rim being greater than the minimum diameter of the opening in said chamber, said sleeve extending beyond the edge of said tapered body section when said rim is at its maximum inward position in said main body section, an elastomeric annular sealing member, wedge-shaped in cross-section, interposed between said sleeve and said main body section, said sealing member being urged against the tapered surface of said main body section when said rim is moved away from the center of said main body section, said sealing member having a radially inwardly protruding lip sealingly positioned adjacent said rim and extending into contact with said cylindrical sleeve, an inserted hose extending between said sealing member and said cylindrical sleeve, the end of the hose abutting said protruding lip so as to provide a seal against the flow of water through said sleeve, said sealing member extending substantially to the end of the tapered portion of said hose-entering chamber, and a radially inwardly extending travel-limiting means of lesser diameter than the outer diameter of said rim disposed within the midsection of said hollow main body section to limit axial inward movement of said sleeve.

2. A hose-mender as defined in claim 1 wherein said protruding lip portion of said sealing member is permanently affixed to the adjacent rim of said sleeve.

3. A hose-mender as defined in claim 1 including toothed serrations on the outer surface of each sleeve.

References Cited by the Examiner

UNITED STATES PATENTS

| 602,617 | 4/1898 | Dale | 285—241 |
|---|---|---|---|
| 1,508,026 | 9/1924 | Noble | 285—343 |
| 1,888,539 | 11/1932 | Otterson | 285—108 |
| 2,338,316 | 1/1944 | Buzzell | 285—48 |
| 2,457,633 | 12/1948 | Borg | 285—331 |

FOREIGN PATENTS

| 137,025 | 4/1950 | Australia. |
|---|---|---|
| 1,168,677 | 9/1958 | France. |
| 1,185,621 | 2/1959 | France. |
| 402,667 | 12/1933 | Great Britain. |
| 818,674 | 8/1959 | Great Britain. |

CARL W. TOMLIN, *Primary Examiner.*